F. H. GRANT.
PROTECTIVE ELEMENT.
APPLICATION FILED FEB. 10, 1915.
1,193,013. Patented Aug. 1, 1916.
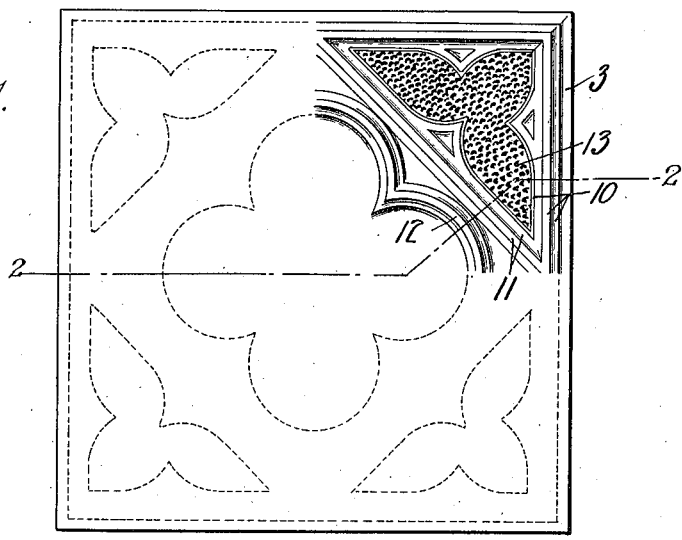
Fig. 1.
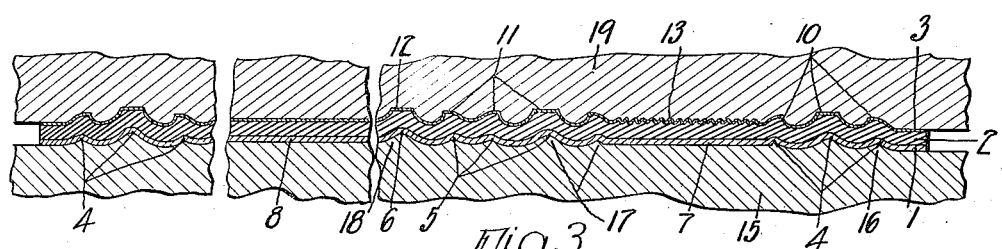
Fig. 2.
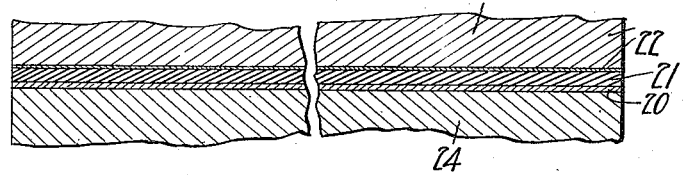
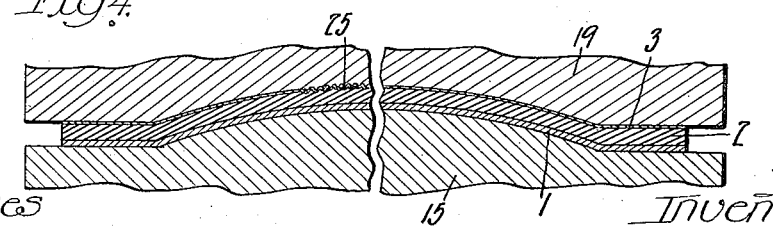
Fig. 4.
Witnesses
E. R. Barrett
H. W. Kreinbring
Inventor
Frank H. Grant,
by Pagelsen & Spencer.
Attys.

UNITED STATES PATENT OFFICE.

FRANK HALL GRANT, OF ST. CLAIR HEIGHTS, MICHIGAN.

PROTECTIVE ELEMENT.

1,193,013.　　　　Specification of Letters Patent.　　Patented Aug. 1, 1916.

Application filed February 10, 1915. Serial No. 7,428.

*To all whom it may concern:*

Be it known that I, FRANK HALL GRANT, a citizen of the Dominion of Canada, and a resident of St. Clair Heights, in the county of Wayne and State of Michigan, have invented a new and Improved Protective Element, of which the following is a specification.

This invention relates to a laminated composite protective element suitable of use for numerous purposes, but especially adapted for interior and exterior coverings for buildings, and in the formation of decorative and protective articles. It is necessary that such elements be capable of resisting the action of the weather and of blows; and in many instances, it is also highly desirable that they may serve to deaden vibrations and sound, and be susceptible of receiving fine details of an embossed design. The matter of expense is, furthermore, of prime importance.

The present invention consists in a very cheap laminated protective element possessing all of the above mentioned physical characteristics, and one much cheaper than elements now in use.

In the accompanying drawings, Figure 1 is a plan view of a protective element made according to my invention and suitable for ceilings, wall facings and the like. Fig. 2 is an enlarged section on the line 2—2 of Fig. 1, showing also the manner of forming and embossing the element in a press. Fig. 3 shows a similar element being formed without embossing. Fig. 4 shows a modified form of embossed element in a press.

Similar reference characters refer to like parts throughout the several views.

Referring to the embodiment of the invention shown in Figs. 1 and 2, 1 indicates a thin sheet metal base plate, preferably of terne or tin plate, or of steel, that, in use, contacts directly with the wall or other support to which the protective element is applied, and is of strength sufficient to resist all stresses to which the element is subjected. The base plate in turn serves as a support for a filler 2, preferably asphalt or similar bituminous compound, somewhat thicker than the former; and the latter constitutes a backing for a very thin ductile metal sheet or cover plate 3, preferably copper, the strength of which is practically negligible, so far as offering resistance to the primary stresses to which the sheet is subjected is concerned. An important function of the copper sheet is that of receiving and retaining the lines of any desired design, and of assuming natural colors that harmonize with standard finishes of furniture. The mutual relation of the copper sheet and the viscous backing is also important in that blows upon the former, incident to ordinary usage, merely cause it to sink into the latter, and are absorbed without tearing the copper sheet; and the filler serves the purpose of deadening vibrations and sound, and acts as a heat insulating medium.

In the design shown, the base plate is provided with a series of longitudinal edge ribs 4, a second series of diagonal corner ribs 5, and an inner foliated rib 6, the portion 7 between the two first mentioned sets of ribs and the portion 8 between the adjacent curves of the rib 6 being substantially flat. It will be noticed that the ribs rise rather gradually from the flat body of the sheet and correspond roughly to the more pronounced features of the design, but would fail to present a design of fine detail; in fact, it would be impossible to impress such a design on the base plate for the reason that the latter, when of metal of sufficient strength and proper quality to resist the stresses to which the element is subjected, possesses too great strength and is too hard to admit of being molded along fine lines, nor would it be possible to impress it on a copper cover sheet of sufficient strength to resist the stresses to which the protective element is subjected. The upper or outer sheet 3 is also provided with two sets of ribs 10 and 11, and with an inner foliated rib 12, that correspond, respectively, to the sets of ribs 4 and 5 and to the rib 6 heretofore described. The transverse curvature of the ribs on the outer sheet is, however, much sharper than that of those on the base plate, as is shown in the drawing, whereby a distinct and accurate design in these particulars is produced; and the area corresponding to the flat portion 7 of the base plate may have impressed thereon, in fine detail, portions of the design as indicated at 13.

In forming the element, the several sheets are arranged in flat condition in the proper order on a die 15 having ribs 16, 17 and 18 conforming to the ribs that are to be formed on the base plate. Upon engagement of this die with another die 19 having thereon the design which it is desired to impress upon the thin sheet 3, the early part of the movement serves to frictionally secure the sheet to the face of the die 19, whereby the former is prevented from moving bodily laterally to any appreciable extent. The pressure increasing, the thin sheet 3 is first shaped to the general configuration of the ribs or grooves in the die 19, after which the ribs are formed in the base plate 1; and, as the die approaches the limit of its movement, the thin metal sheet 3 is further stretched and forced outwardly by the plastic asphalt, which distributes the heavy pressures along lines at substantially right angles to the faces of the parts of the design formed in the die 19, and forces the thin metal to conform precisely to all the irregularities and fine lines in the face of the die. At the same time, the asphalt filler is caused to flow slightly and to form an intimate cementing bond with each individual portion of the area of both metal sheets, whereby the layers of the composite element are firmly secured together.

Either one or both of the dies may be movable; and the sheet as a whole may be reversed from the position shown, in which case the desired design would, of course, appear upon the lower die. Furthermore, the design may either be in relief or intaglio. It will also be noticed that the filler 2 acts substantially as a part of the male die, in that it transmits pressure to the sheet 3 in such directions as to make the latter conform to the design in the upper or female die. The male die 15, if applied directly to the sheet 3, would tend to tear the latter, since the pressures would be substantially vertical throughout, whereas the action of the filler on the sheet is analogous to that of hydraulic pressure, and causes gradual stretching without abrasion.

Fig. 3 shows a non-embossed sheet, the base plate 20, filler 21 and cover sheet 22 of which correspond to the sheets heretofore described and are cemented together by pressure of the dies 23 and 24.

In the embodiment shown in Fig. 4, the element as a whole is crowned and the central portion 25 of the upper sheet is embossed in fine detail similar to the portion 13, already described. As the parts correspond in relative position to those shown in Fig. 2, they have been given the same reference numerals.

It is obvious that many changes may be made in the details of the design without departing from the spirit of my invention. Also other soft ductile metals, for example, lead, may be used in certain instances in lieu of copper. I do not, therefore, wish to be limited otherwise than as indicated by the subjoined claims.

I claim:—

1. A composite protective element comprising a base plate consisting of a thin sheet of relatively hard metal of strength sufficient to withstand the stresses to which the element is to be subjected, a thin filler sheet of viscous material, and a very thin cover sheet of soft ductile metal, the cover sheet and the base plate being cemented throughout to the filler sheet and the cover sheet having the details of the design formed thereon, portions of the design on the cover sheet being located at different perpendicular distances from the corresponding portions of the base plate.

2. A composite protective element comprising a base plate consisting of a thin sheet of relatively hard metal of strength sufficient to withstand the stresses to which the element is to be subjected, a thin filler sheet of sticky bituminous material, and a very thin cover sheet of copper, the metal sheets being cemented throughout to the filler sheet and the cover sheet having the details of the design formed thereon, portions of the design on the cover sheet being located at different perpendicular distances from the corresponding portions of the base plate.

3. A composite protective element comprising a base plate consisting of a thin sheet of relatively hard metal of strength sufficient to withstand the stresses to which the element is to be subjected, a thin filler sheet of viscous material, and a very thin cover sheet of soft ductile metal, the metal sheets being cemented throughout to the filler sheet and the cover sheet having the details of the design formed thereon, portions of the design on the cover sheet being located at different perpendicular distances from the corresponding portions of the base plate, a portion of the base plate being raised from the general plane of the plate to correspond roughly to a pronounced portion of the design on the cover sheet.

4. A composite protective element comprising a base plate consisting of a thin sheet of relatively hard metal of strength sufficient to withstand the stresses to which the element is to be subjected, a thin filler sheet of sticky bituminous material, and a very thin cover sheet of copper, the metal sheets being cemented throughout to the filler sheet and the cover sheet having the details of the design formed thereon, portions of the design on the cover sheet being located at different perpendicular distances from the corresponding portions of the base plate, a portion of the base plate being raised from the general plane of the plate to correspond roughly to a pronounced portion of the design on the cover sheet.

5. A composite protective element comprising a base plate consisting of a thin sheet of relatively hard metal of strength sufficient to withstand the stresses to which the element is to be subjected, a thin filler sheet of viscous material, and a very thin cover sheet of soft ductile metal, the metal sheets being cemented throughout to the filler sheet by the material of the latter and the cover sheet having the details of the design formed thereon, portions of the design on the cover sheet being located at different perpendicular distances from the corresponding portions of the base plate.

6. A composite protective element comprising a metal base sheet of strength sufficient to withstand the primary stresses to which the element is to be subjected, a thin filler sheet of viscous material, and a cover sheet of soft ductile metal of less thickness than either of the other sheets, the base sheet and the cover sheet being cemented throughout to the filler sheet by the material of the latter and the cover sheet having the details of a design formed thereon, portions of the design on the cover sheet being located at different perpendicular distances from the corresponding portions of the base sheet.

In testimony whereof I sign this specification in the presence of two subscribing witnesses.

FRANK HALL GRANT.

Witnesses:
L. M. SPENCER,
HUGO W. KREINBRING.